Aug. 15, 1933.                R. SMITH                1,922,141
                              CONVEYER
                       Filed Sept. 12, 1932           7 Sheets-Sheet 1

Inventor
RAMSEY SMITH
By Jerry A. Mathews
Attorney

Aug. 15, 1933.    R. SMITH    1,922,141
CONVEYER
Filed Sept. 12, 1932    7 Sheets-Sheet 5

Inventor
RAMSEY SMITH

Aug. 15, 1933.                R. SMITH                1,922,141
                              CONVEYER
                         Filed Sept. 12, 1932          7 Sheets-Sheet 6

Inventor
RAMSEY SMITH
By Jerry A. Matthews
            Attorney

Aug. 15, 1933.  R. SMITH  1,922,141
CONVEYER
Filed Sept. 12, 1932  7 Sheets-Sheet 7

Inventor
RAMSEY SMITH
By Jerry A. Mathews
Attorney

Patented Aug. 15, 1933

1,922,141

UNITED STATES PATENT OFFICE 1,922,141

CONVEYER

Ramsey Smith, Puerto Castilla, Honduras

Application September 12, 1932
Serial No. 632,799

10 Claims. (Cl. 198—130)

My invention relates to conveyers of the type wherein one or more carrier units are moved by a flexible traveling element.

An important object of the invention is to so construct the carrier unit, that should it project toward the horizontal pulley, defining the change in horizontal direction of the cable, when the carrier unit approaches such horizontal pulley, then the carrier element of the unit is automatically shifted to the opposite side of the cable from the horizontal pulley, thus enabling the unit to properly pass about the pulley, without causing the cable to leave such pulley.

A further object of the invention is to provide weight means to substantially balance the carrier element and parts mounted thereon, when the carrier element is shifted to either side of the cable.

A further object of the invention is to provide means whereby the point of suspension of the load upon the unit is directly beneath or in vertical alignment with the cable.

A further object of the invention is to provide apparatus of the above-mentioned character which is automatic in operation, strong and durable.

Other objects and advantages of the invention will be apparent during the course of the following description.

In the accompanying drawings, forming a part of this specification, and in which like numerals are employed to designate like parts throughout the same.

Figure 1:
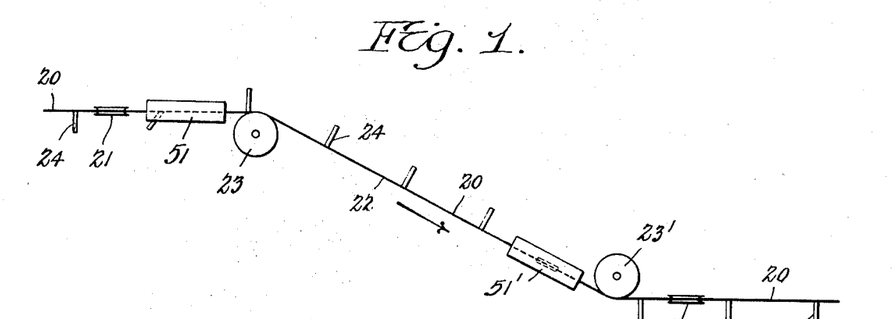
Figure 1 is a plan view, partly diagrammatic, of a conveyor apparatus embodying my invention.

In the drawings, wherein for the purpose of illustration is shown a preferred embodiment of my invention, attention being called first to Figure 1, the numeral 20 designates a traveling flexible element, such as a cable. This cable may be moved longitudinally by any suitable means, as is well known in cable conveyers. Throughout its straight runs, the cable is supported by vertical grooved pulleys 21. When the cable 20 has its horizontal direction changed, the angularly disposed portion or run 22 thereof, is passed about the opposite faces of horizontal grooved pulleys 23 and 23'. The cable 20 carries any number of carrier units 24. As the carrier units 24 approach the horizontal pulley 23, while extending laterally toward such pulley, they are automatically shifted so that they project upon the opposite side of the cable in a direction from the pulley 23, thus enabling the cable and carrier unit to travel about the horizontal pulley 23. As each successive carrier unit approaches the horizontal pulley 23', it is projecting toward this pulley and is, therefore, automatically shifted to a position upon the opposite side of the cable so that the cable and carrier unit may pass about the grooved pulley 23'. This mode of operation is indicated generally in Figure 1 of the drawings, and will be explained more fully hereinafter.

Figures 5, 6, 7, 8:
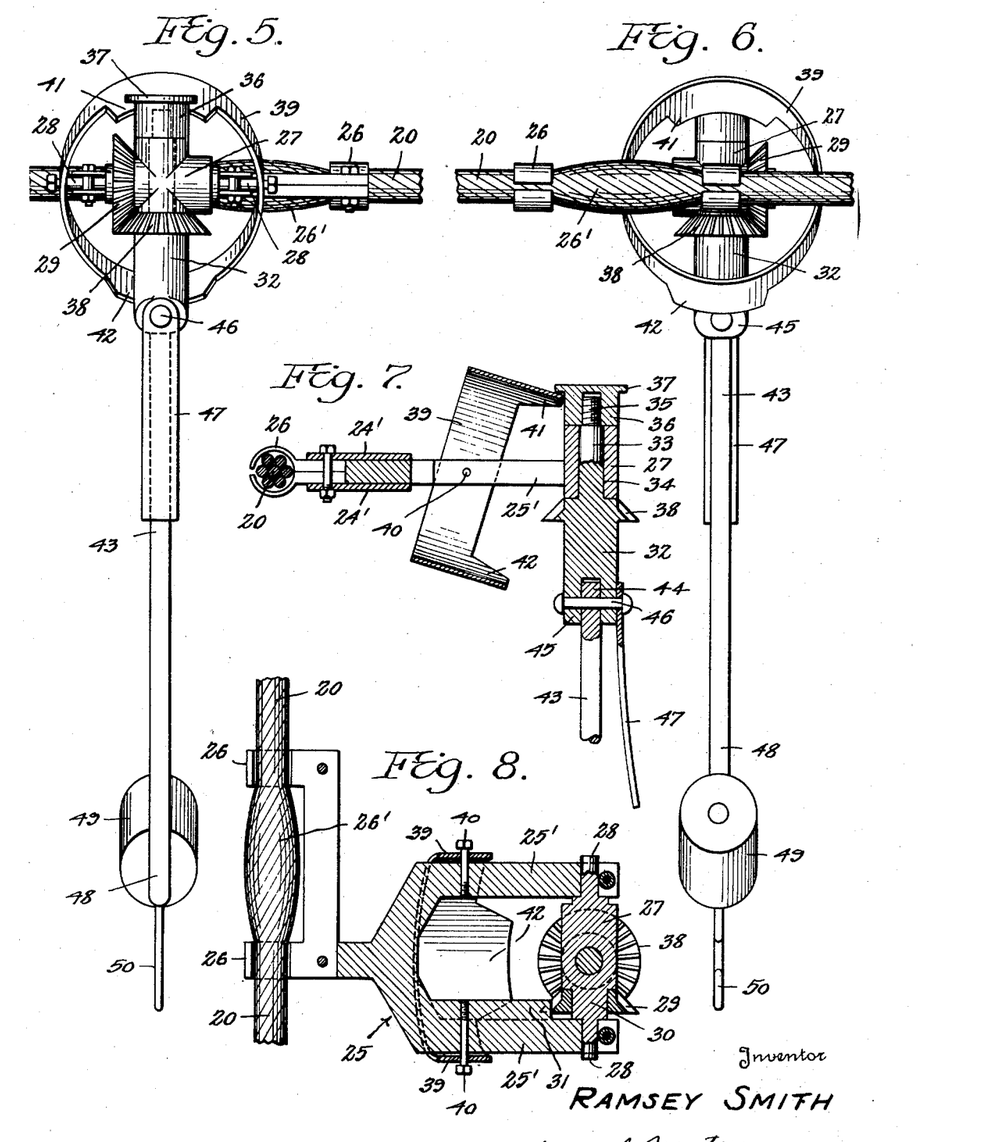
Figure 5 is a side elevation of the carrier unit.
Figure 6 is a similar view of the opposite edge of the carrier unit.
Figure 7 is a transverse section taken on line 7—7 of Figure 4.
Figure 8 is a horizontal section taken on line 8—8 of Figure 3.

Each carrier unit embodies a carrier element 25, having spaced tines 25' at its free end. The carrier element is provided with wear plates 24'. At the opposite end, the carrier element is provided with pairs of spaced knuckles 26, which pivotally receive the cable 20, see Figure 8. The cable is preferably provided with an enlargement 26', between these pairs of spaced knuckles, so that the carrier element cannot move perceptibly longitudinally of the cable and travels therewith, but is free to swing transversely vertically about the longitudinal axis of the cable. The knuckles 26 correspond generally to the transverse curvature of the cable, and are adapted to travel about the vertical and horizontal grooved pulleys without causing the cable to disengage therewith.

Arranged between the tines 25' is a normally vertical pivoted head 27, provided at its ends with trunnions 28, suitably journaled within the ends of the tines, as shown. A beveled gear 29 rotatably receives a cylindrical extension 30 of the head 27, and this beveled gear 29 is locked against turning movement with relation to the tines 25', by means of a rib 31, or the like, preferably formed integral with the adjacent tine, and engaging between teeth of the beveled gear 29. The head 27 is capable of turning upon its horizontal axis with relation to the gear 29.

Co-acting with the vertical head 27 is a vertical head 32, arranged beneath the same, and carrying a cylindrical shaft 33, rotatably mounted within a cylindrical opening or bore 34, formed in the head 27. This shaft 33 is provided with a screw-threaded trunnion 35, carrying a cylindrical nut 36, provided at its top with a radially projecting annular flange 37. Any suitable lock means may be employed, if necessary, to prevent the nut 36 from improper disengagement from the trunnion 35. The vertical head 32 and its shaft 33 are capable of turning upon their longitudinal axes with respect to the head 27. The vertical head 32 carries a beveled gear 38, preferably formed integral therewith, and this beveled gear is in permanent mesh with the beveled gear 29.

The numeral 39 designates a loop shaped latch element, which straddles the tines 25', and is pivoted between its ends with these tines, as shown at 40. This latch element 39 frictionally engages the sides of the tines 25' and, therefore, remains in the shifted or adjusted position, until removed therefrom. This latch element extends above and below the tines, as shown. At its top, the latch element has a dog or extension 41, adapted to engage beneath the flange 37, and thereby lock the head 27 against turning movement in one direction, with respect to the carrier element 25. At its lower end, the latch element has an extension 42, serving as a re-setting element, as will be described.

Arranged beneath the vertical head 32 is a load member, arm or rod 43, the upper portion of which is straight, and is provided at its upper end with a knuckle 44, disposed between a pair of knuckles 45, these several knuckles being pivotally connected by means of a pin 46, the pin also serving to attach a shifting leaf or element 47 to the adjacent knuckle, as shown. Particular attention is called to the fact that the knuckles 44 and 45 are so positioned with respect to the cable 20, that the pin 46 extends transversely of the cable, Figure 3, whereby the arm 43 may swing with respect to the vertical head 32, in a direction longitudinally of the cable, but not with relation to the head 27 in a direction transversely of the cable. The load arm 43 projects downwardly beyond the head 27 for a substantial distance, and has its lower portion bent into a laterally curved portion 48, carrying at its free end a counterweight 49. A load suspending element 50, in the form of a hook, or the like, is attached to the curved end portion of the load arm 43, and is directly beneath or in vertical alignment with the cable 20, when the head 32 is in the vertical position. The weight 49 balances the weight of the carrier 25, and all elements mounted thereon, and since the weight is upon the opposite side of the cable 20, with respect to the carrier element 25, the entire carrier unit is balanced, and the hook 50 is maintained beneath the cable 20 in direct vertical alignment with the cable. When the load, such as a bunch of bananas, is hung upon the hook 20, it will be suspended from the cable through the medium of the carrier unit, and the center of gravity of the load will be in vertical alignment with the cable.

Arranged near and in advance of the horizontal grooved pulley 23, Figure 1, is a stationary shifting device, designated as a whole, by the numeral 51. This shifting device 51 is rigidly attached to a suitable stationary support 52, disposed near and above the cable. This shifting device embodies a cam device including a vertical plate or web 53, bent at its lower end into a circularly curved portion 54. A guide tube 55 is disposed concentrically within this circularly curved portion 54, and is rigidly attached thereto by radial arms 56. The guide tube is provided upon its outer side with a longitudinal slot 57, extending throughout its entire length. This slot is longitudinally curved and is of sufficient width to receive the carrier element 25, and permit the same to follow the cam surface to be described. This tube receives the cable 20, and is also adapted to receive the knuckles 26, and functions to retain these knuckles in a concentric position with relation to the curved portion 54, while the carrier is passing through the cam device. The curved portion 54 has its free edge in the form of a cam surface 59. This cam surface 59 starts from a point 60, and gradually rises slightly to a point 61, and then gradually descends to the lowermost point 62. A latch shifting shoe 63 is arranged outwardly of and near the curved portion 54, and is held stationary by vertical rods 64, mounted upon horizontal rods 65, attached to the curved portion 54. This shoe is curved longitudinally in a horizontal plane. The function of this shoe is to engage the latch element 39 and shift the same to the released position.

The numeral 47' designates a second stationary shoe, which is curved longitudinally in a horizontal plane, and this shoe is arranged to engage the shifting leaf 47.

Figure 9:
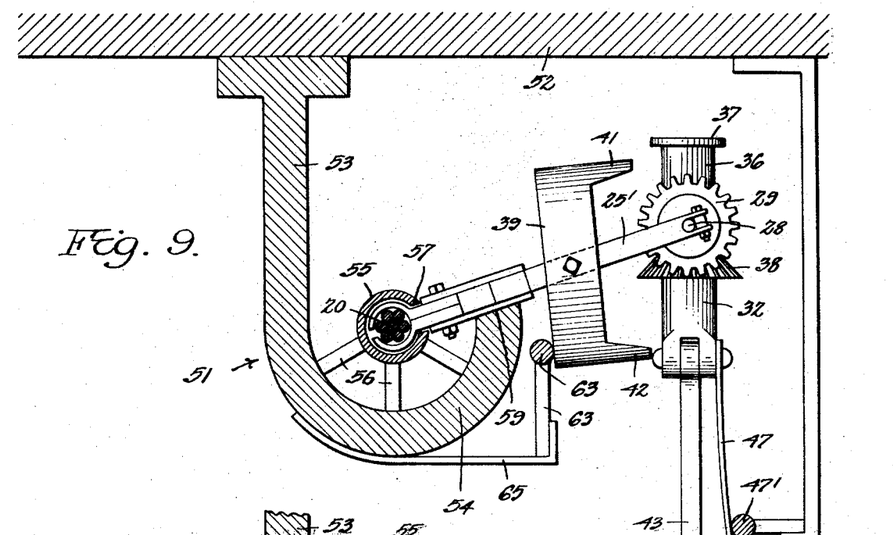
Figure 9 is a side elevation of the carrier unit, showing the same elevated above the normal traveling position.
Figure 10:
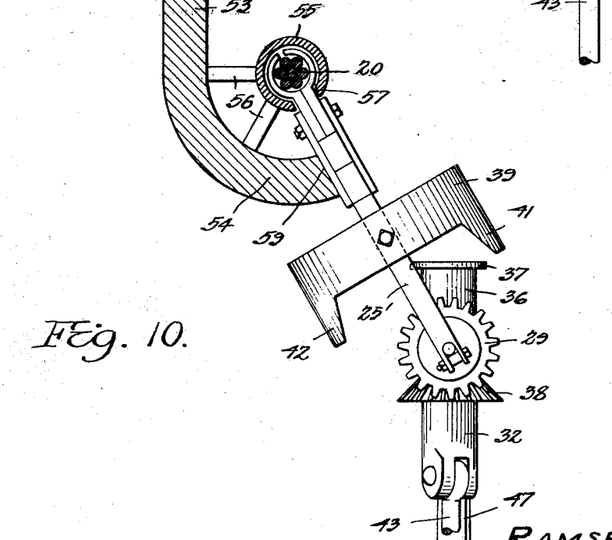
Figure 10 is a similar view showing the carrier unit approaching the end of the lowering operation.

In Figure 9, the carrier element 25 has engaged the cam surface 59, and has traveled to the peak 61, thereby shifting the carrier element above the normal horizontal position, and this movement of the carrier element has caused the latch element 39 to engage at its lower end with the shoe 63, and the leaf 47 with the shoe 47', whereby this latch element is swung upon its pivots 40, and the dog 41 caused to disengage from beneath the flange 37. As the carrier element 25 travels longitudinally of the cam surface 59, toward the lower end 62, it gradually swings downwardly, as shown in Figure 10, until it reaches a vertical depending position.

Figure 20:
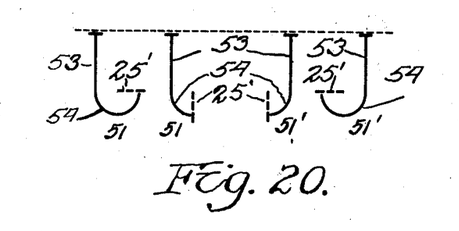
Figure 20 is a diagrammatic view showing the cross sectional shape and arrangement of the cam devices in one shifting device, and, Figure 21 is a similar view showing the cross sectional shape and arrangement of the cam devices in the other shifting device.
Figure 21:
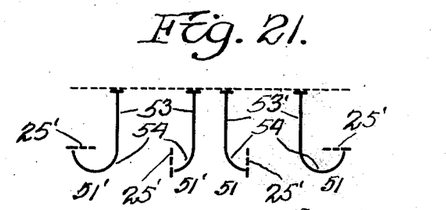

Disposed in end to end relation to the cam device in the shifting device, is a second cam device, which is identical with the same, excepting that the lower end 62 of the cam surface 59 is arranged at the take-up end of the device while the point 60 thereof is at the discharge end. The vertical webs 53 of these two devices are transversely spaced so that their curved portions 54 are concentric and arranged in end to end relation. A stationary shoe 48' is provided, which is longitudinally curved in a horizontal plane, to engage the leaf 47, but the shoe 63 is omitted. Disposed near and in advance of the pulley 23' is a shifting device 51', which is identical with the shifting device 51, except that the cam devices face laterally in an opposite direction to the cam devices in the shifting device 51, as shown in Figures 20 and 21.

Figure 2:
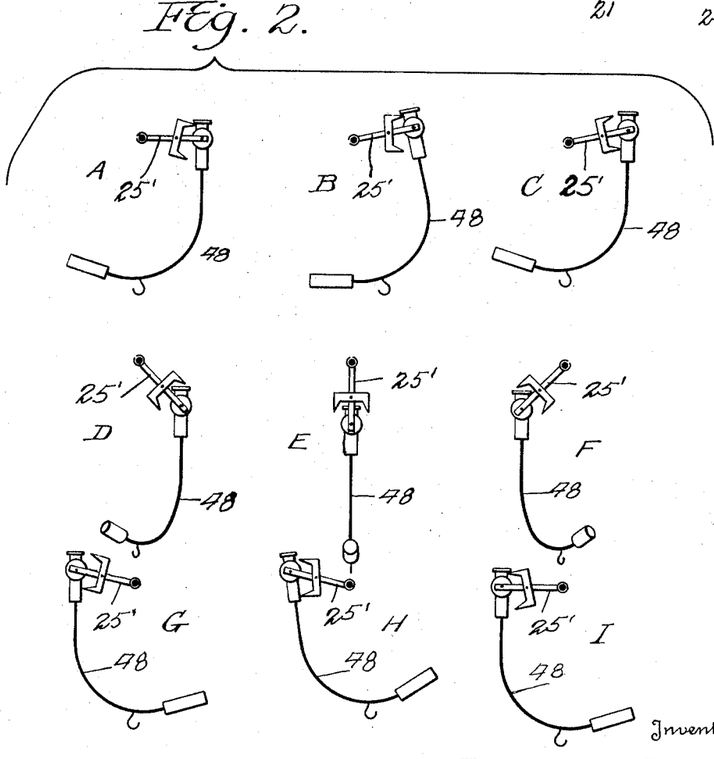
Figure 2 is a series of diagrammatic views, illustrating the mode of operation of a carrier unit.

The operation of the apparatus is as follows:

As shown in Figure 1, the cable 20 is traveling to the right. As each carrier unit extending laterally toward the pulley 23 approaches the horizontal pulley 23, Figure 1, the carrier element 25, which is horizontally arranged, rides over the intake end 60 of the cam surface 59, and engages this cam surface. The parts of the carrier unit are now in the relative positions, as shown at A, Figure 2. It will be noted that the carrier element 25 is horizontally arranged, and the load arm 43 extends at a right angle to the direction of the travel of the cable. Further movement of the carrier element 25, with the cable, causes the same to engage with the cam surface and when the high point 61 is reached, the carrier element is swung upwardly above the horizontal, as illustrated in B, Figure 2, and also in Figure 9 of the drawings. When in this position, the latch element 39 engages the shoe 63, whereby the latch element is turned upon its pivots 40, so that the dog 41 is withdrawn from beneath the flange 37. At the same time, the leaf 47 is engaging the stationary shoe 47', whereby the vertical head 32 is held in the vertical position during the separation of the dog 41 and the flange 37. The disengagement of the dog and flange is clearly shown at C, in Figure 2. The continued travel of the carrier element 25 longitudinally of the cam surface 59, results in the lowering of the carrier element first to the horizontal position, the dog 41 and flange 37 still being disengaged, and the subsequent lowering of the carrier element, until it approaches a perpendicular depending poistion. This action is indicated at D, Figure 2, and also Figure 10. As the carrier element 25 reaches the point 62, it is then depending perpendicularly, as clearly shown at E, in Figure 2.

Figures 3, 4:
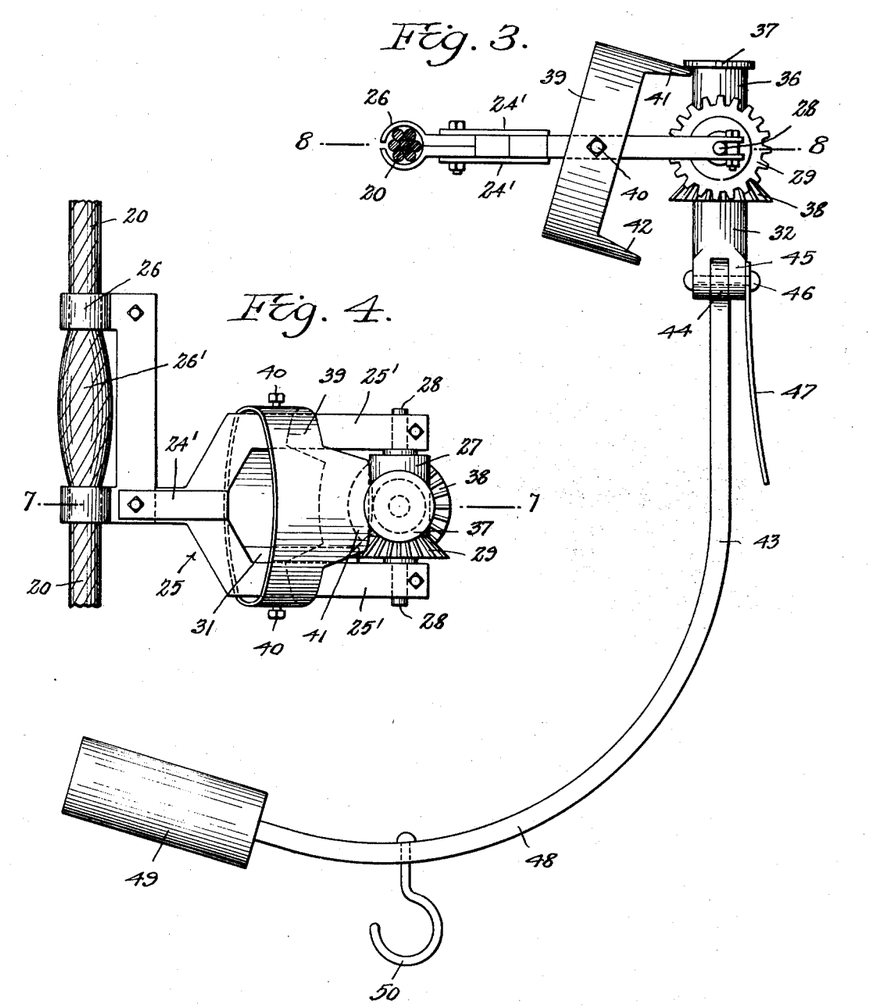
Figure 3 is a side elevation of one carrier unit.
Figure 4 is a plan view of the same.
Figure 11:
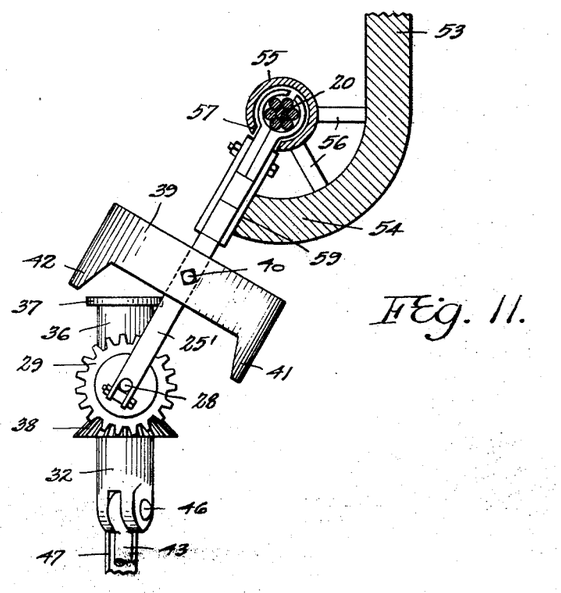
Figure 11 is a similar view of the carrier unit showing the same at the commencement of the elevating operation.
Figure 12:
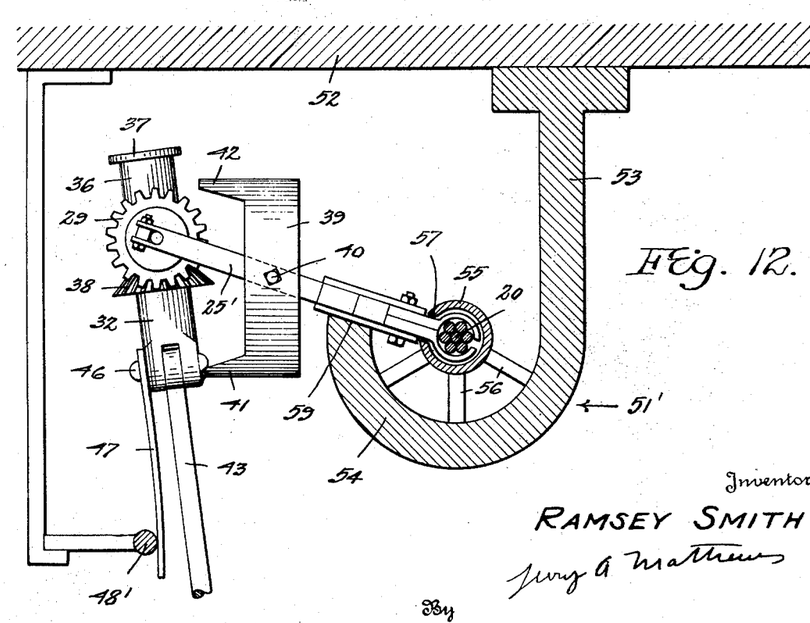
Figure 12 is a similar view showing the carrier unit returned to the uppermost position upon the opposite side of the cable.
Figure 13:
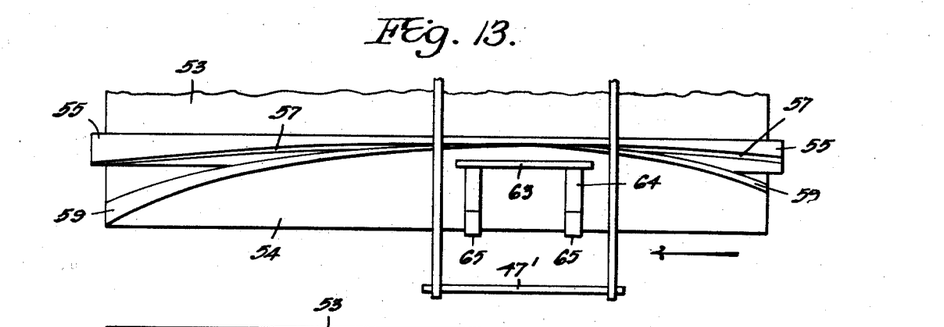
Figure 13 is a side elevation of the cam device, for releasing and lowering the carrier element.
Figure 14:
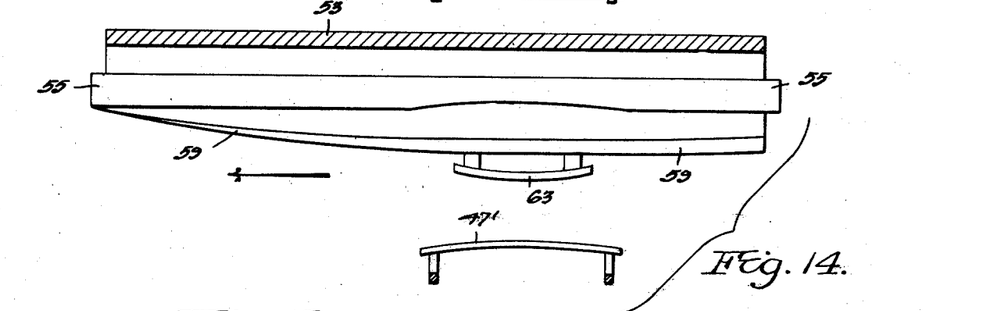
Figure 14 is a plan view of the same, parts in section.
Figure 15:
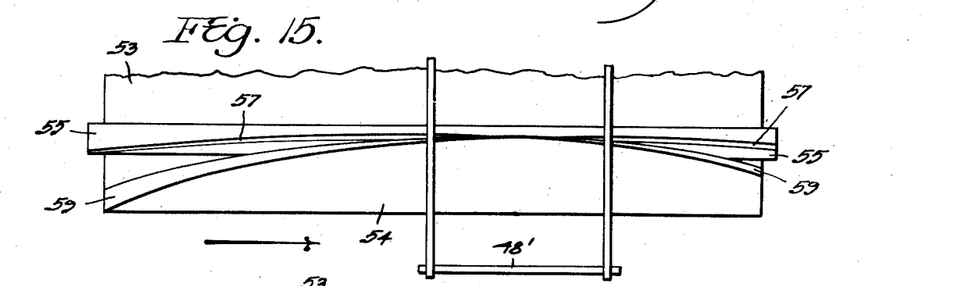
Figure 15 is a side elevation of the companion cam device for shifting the carrier element upon the opposite side of the cable and raising the same.
Figure 16:
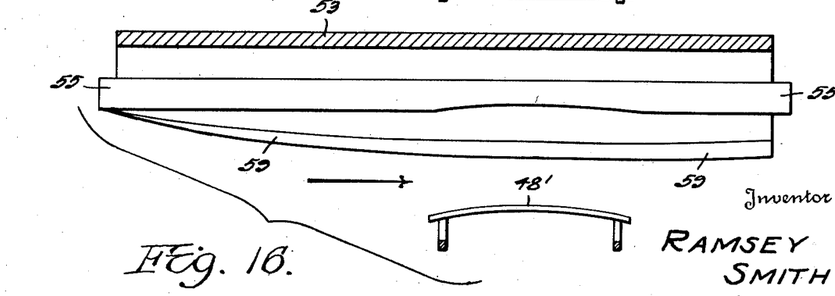
Figure 16 is a plan view of the same, parts in section.
Figure 17:
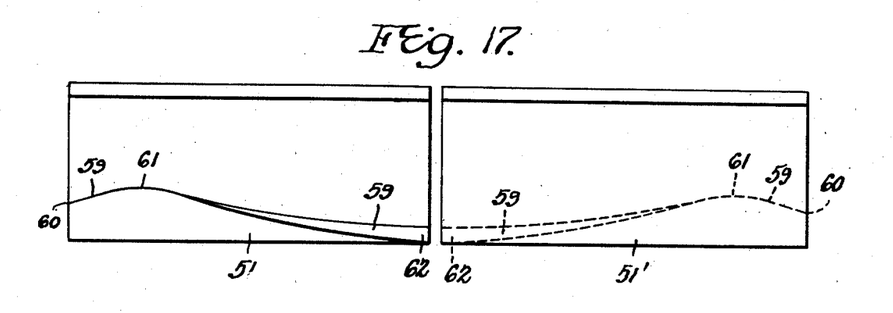
Figure 17 is a side elevation of the two assembled cam devices for effecting a complete cycle of movement of the carrier element.
Figures 18, 19:
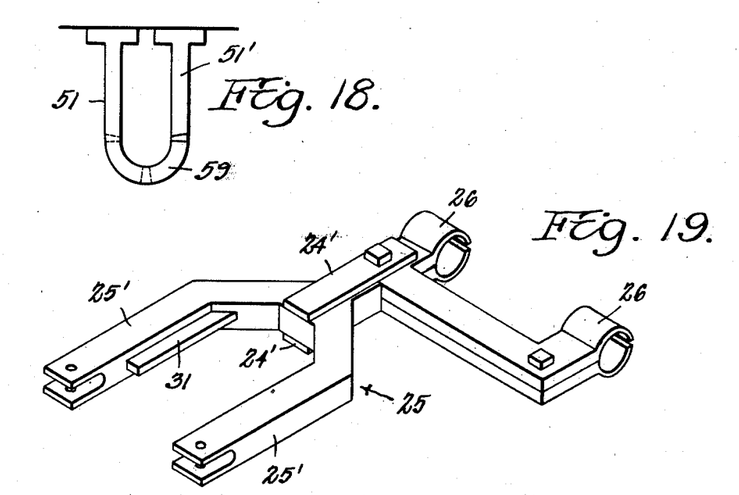
Figure 18 is an end elevation of the same.
Figure 19 is a perspective view of the carrier element of the unit.

When the carrier 25 was in the horizontal position, it extended upon the same side of the cable with the grooved pulley, and the weight 49 was arranged upon the opposite side of the cable. As the carrier element 25 descends, the head 32 remaining substantially vertical, there is a relative angular movement between this head and the carrier element 25, resulting in a turning movement of the gear 38 about the gear 29, which is held against turning movement upon its axis. The head 32 is, therefore, rotated about its longitudinal or vertical axis and by the time the carrier 25 descends to the perpendicular position to disengage the cam surface 59 of the shifting device 51, the load arm 48 has been turned through 90°, so that the lower curved portion thereof now extends longitudinally of the cable. Further travel of the carrier with the cable 20 causes the vertical depending carrier to be picked up by the lower end 62 of the cam surface of the companion cam device, and to be gradually swung upwardly upon the right or opposite side of the cable, so that this carrier extends from the grooved pulley 23. The beginning of this raising of the carrier element upon the right side of the cable is illustrated at F, Figure 2, and Figure 11 of the drawings. By the time the point 61 in the cam surface is reached, the carrier 25 has been shifted upwardly past the horizontal position, as indicated at H, in Figure 2, and also Figure 12. In this position, the leaf 47 engages the stationary shoe 48', which swings the head 32 upon its pivot so that it assumes a slight angular position, with its lower end extended toward the shifting device. The lower end of this head 32 will now engage the shifting extension 42, and swing the latch device 39 upon its pivots, so that this latch device will assume the original angular position with relation to the carrier element, as shown in Figure 3. Further travel of the carrier element 25 will cause the same to pass the high point 61, and the carrier element will then assume the horizontal position, with the dog 41 engaging beneath the flange 37, whereby the carrier element and the head 32 are again locked in one direction against relative angular movement. The carrier element 25 is now horizontally disposed upon the right side of the horizontal pulley 23, and extends away from the same. During the vertical swinging movement of the carrier element 25 from the depending perpendicular position to the raised horizontal position, there is a further relative angular movement between the carrier element 25 and the head 27, causing the beveled gear 37 to continue its travel about the gear 29, which is held against turning movement upon its axis. This relative turning movement causes the continued turning movement of the load arm 43, which is again turned through a distance of 90°, the weight 49 being now positioned upon the left side of the cable or upon the same side of the cable with the pulley 23. It is thus seen that by the time the carrier element reaches the pulley 23, the carrier element will be arranged upon the remote side of the pulley, and hence the knuckles 26 will travel with the cable about the grooved pulley. As each carrier unit passes the pulley 23, and approaches the next pulley 23', the carrier element 25 extending toward this pulley, the next shifting devices 51', which are identical with the shifting devices previously described, except that their curved portions 54 extend laterally in opposite directions, act upon such carrier element, and swing the same vertically transversely of the cable, until the carrier assumes a horizontal position upon the opposite side of the cable, remote from the horizontal pulley 23', the load arm 43 being turned throughout 180°, so that its weight 49 is now positioned upon the right side of the cable with the pulley 23'.

It is to be understood that the form of my invention, herewith shown and described, is to be taken as the preferred example of the same, and that various changes in the shape, size and arrangement of parts may be resorted to without departing from the spirit of my invention, or the scope of the subjoined claims.

Having fully described my invention, what I claim is:

1. In a conveyer, a traveling flexible element, a carrier unit embodying a carrier element pivotally connected with the flexible element, means to shift the carrier element from one side of the flexible element to the opposite side thereof, and weight means to substantially balance the carrier element when shifted to the generally horizontal position upon either side of the flexible element.

2. In a conveyer, a flexible traveling element, a carrier element pivotally connected with the flexible element, means to swing the carrier element from one side of the flexible element to the opposite side thereof, a weight normally disposed upon the side of the flexible element remote from the carrier element to substantially balance the carrier element, and means connecting the weight and the carrier element and serving to shift the weight upon one side of the flexible element when the carrier element is moved to the opposite side of such flexible element.

3. In a conveyer, a flexible traveling element, a carrier element connected with the flexible element and movable transversely with relation thereto for assuming positions upon opposite sides of the same, means to shift the carrier element from one side of the flexible element to the opposite side of the same, a weight for substantially balancing the carrier element, and means connecting the weight with the carrier element and serving to shift the weight upon one side of the flexible element when the carrier element is shifted to the opposite side of the flexible element.

4. In a conveyer, a flexible traveling element, a carrier element connected with the flexible element, means to shift the carrier element from one side of the flexible element to the opposite side thereof, a load member connected with the carrier element so that such load member may turn upon its longitudinal axis with relation thereto, said load member having a lateral extension, a weight carried by the lateral extension, and means to automatically turn the load member upon its longitudinal axis when the carrier element is shifted laterally from one side of the flexible element toward the opposite side.

5. In a conveyer, a flexible traveling element, a carrier element pivotally connected with the flexible element to swing transversely thereof, a weight, a load arm pivotally connected with the carrier element and having a lateral extension carrying the weight, the weight being positioned upon one side of the flexible element and serving to normally support the carrier element in a generally horizontal position upon the opposite side of the flexible element, and automatic means actuated by the relative angular movement between the carrier element and load arm to turn the load arm upon its longitudinal axis to shift the weight from one side of the flexible element to the opposite side.

6. In a conveyer, a flexible traveling element, a carrier element pivotally connected with the flexible element to be swung transversely thereof for assuming generally horizontal positions upon opposite sides of the same, a coupling pivotally connected with the carrier element to turn in the plane of swinging movement of the same, a load arm connected with the coupling and adapted to turn upon its longitudinal axis with relation thereto, said load arm having a lateral extension, a weight carried by the lateral extension and serving to substantially balance the carrier element in the generally horizontal position upon either side of the flexible element, a latch device for locking the carrier element and coupling against relative angular movements in one direction, means to release the latch device, a gear mounted upon the carrier element and held against turning movement upon its axis, a second gear connected with the load arm to turn the same and engaging the first-named gear, means to re-set the latch device, and cam means to engage the carrier element to shift the same from the generally horizontal position upon one side of the flexible element to a generally horizontal position upon the opposite side of the same.

7. In a conveyer, a travelling flexible element, a carrier unit embodying a carrier element pivotally connected with the flexible element to be shifted transversely thereof so that it may assume positions upon opposite sides of the flexible element, means to shift the carrier element from one side of the flexible element to the opposite side, weight means pivotally connected with the carrier element to swing with relation thereto in a direction transversely of the flexible element and adapted to substantially balance the carrier element when such carrier element is in the operative position, means to lock the weight means with the carrier element to prevent relative turning movement in one direction, and devices to actuate the locking means.

8. In a conveyer, a flexible travelling element, a carrier element connected with the flexible element and movable transversely of the same to asssume positions upon opposite sides thereof, a load carrying arm angularly adjustably connected with the carrier element, means to lock the carrier element and arm against relative angular movements in one direction, means to actuate the locking means, and means to shift a part of the load carrying arm upon one side of the flexible element when the carrier element is shifted upon the opposite side of the flexible element so that the load carrying element substantially balances the carrier element.

9. In a conveyer, a flexible travelling element, a carrier element connected with the flexible element and movable transversely of the same to assume positions upon opposite sides thereof, means to shift the carrier element upon opposite sides of the flexible element, a load carrying arm angularly adjustably connected with the carrier element and having a lateral extension projecting upon the opposite side of the flexible element with respect to the carrier element, said lateral extension having a weight part disposed upon the opposite side of the flexible element with respect to the carrier element, said lateral extension also having a load attaching part arranged in substantially vertical alignment with the flexible element, means to lock the carrier element and arm against relative angular movements in one direction, means to actuate the locking means, and means to shift the weight part of the load carrying arm upon one side of the flexible element when the carrier element is shifted upon the opposite side so that the weight part substantially balances the carrier element.

10. In a conveyer, as a sub-combination, a pivotally supported carrier element, a coupling pivotally connected with the carrier element to turn with relation thereto in the plane of movement of the carrier element, a load supporting member pivotally connected with the coupling to turn with relation thereto, a gear connected with the load supporting member to turn therewith, a second gear engaging the first gear and held against turning movement with relation to the carrier element, and releasable means to lock the coupling and carrier element against relative turning movement in one direction.

RAMSEY SMITH.